United States Patent
Tirronen et al.

(10) Patent No.: US 12,279,316 B2
(45) Date of Patent: *Apr. 15, 2025

(54) SENSOR-DATA BATCHING FOR EFFICIENT EARLY DATA

(71) Applicant: Telefonaktiebolaget LM Ericsson (publ), Stockholm (SE)

(72) Inventors: Tuomas Tirronen, Helsinki (FI); Ari Keränen, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/439,869

(22) Filed: Feb. 13, 2024

(65) Prior Publication Data

US 2024/0188141 A1 Jun. 6, 2024

Related U.S. Application Data

(63) Continuation of application No. 16/975,596, filed as application No. PCT/EP2019/054577 on Feb. 25, 2019, now Pat. No. 11,956,828.

(Continued)

(51) Int. Cl.
*H04W 74/08* (2024.01)
*H04W 4/38* (2018.01)
(Continued)

(52) U.S. Cl.
CPC ......... *H04W 74/0833* (2013.01); *H04W 4/38* (2018.02); *H04W 4/70* (2018.02); *H04W 72/04* (2013.01); *H04W 72/1263* (2013.01)

(58) Field of Classification Search
CPC ..... H04W 74/0833; H04W 4/38; H04W 4/70; H04W 72/04; H04W 72/1263; Y02D 30/70
See application file for complete search history.

(56) References Cited

U.S. PATENT DOCUMENTS

2013/0016602 A1* 1/2013 Diachina ............... H04L 1/0009
370/336
2015/0023281 A1 1/2015 Wu
(Continued)

FOREIGN PATENT DOCUMENTS

CN 104205670 A 12/2014

OTHER PUBLICATIONS

Chinese Office Action for Chinese Patent Application No. 201980015532.3 mailed Aug. 22, 2023, 13 pages.
(Continued)

*Primary Examiner* — Faruk Hamza
*Assistant Examiner* — Aixa A Guadalupe Cruz
(74) *Attorney, Agent, or Firm* — Sage Patent Group

(57) ABSTRACT

A method of operating a user equipment, UE, that is operating in a network includes determining whether the UE and/or an application that is running on the UE is using or planning to use an early data transmission, EDT, to transmit sensor data via the network. Operations include responsive to determining that the UE and/or the application that is running on the UE is using or planning to use the EDT, informing the application of configuration parameters corresponding to the EDT and altering, by the application and based on the configuration parameters corresponding to the EDT, properties of the sensor data that is provided to the UE for transmission to the network to include revised sensor data.

20 Claims, 9 Drawing Sheets

Related U.S. Application Data

(60) Provisional application No. 62/635,027, filed on Feb. 26, 2018.

(51) Int. Cl.
    *H04W 4/70*         (2018.01)
    *H04W 74/0833*    (2024.01)
    *H04W 72/04*       (2023.01)
    *H04W 72/1263*    (2023.01)

(56) References Cited

U.S. PATENT DOCUMENTS

2019/0159197 A1* 5/2019 Shrestha ............... H04W 72/21
2019/0350037 A1* 11/2019 Lee ................... H04W 52/0229
2020/0187245 A1* 6/2020 Fujishiro ........... H04W 74/0833

OTHER PUBLICATIONS

Kyocera, "Padding issue of EDT in eFeMTC and FeNB-IoT," R2-1803417, 3GPP TSG-RAN WG2 #101, Athens, Greece, Feb. 26-Mar. 2, 2018, Agenda item: 9.14.2, 3 pages.

MediaTek Inc., "On NB-IoT EDT indication via PRACH," R1-1719592, 3GPP TSG RAN WG1 Meeting #91, Reno, Nevada, USA, Nov. 27-Dec. 1, 2017, Agenda Item: 6.2.6.1.2, 5 pages.

International Search Report and Written Opinion of the International Searching Authority, PCT/EP2019/054577, mailed Apr. 26, 2019, 11 pages.

"On NB-IoT EDT indication via PRACH," (XP051372581) 3GPP TSG RAN WG2 Meeting #100, Reno, NV, USA, Nov. 27-Dec. 1, 2017, Agenda Item 9.13.2, MediaTek Inc., R2-1713679, 5 pages.

"On Early Data Transmission for NB-IoT," (XP051316167) 3GPP TSG RAN WG1 Meeting #90, Prague, Czech Republic, Aug. 21-25, 2017, Agenda Item 5.2.7.1.3, Huawei, HiSilicon, R1-1713363, 4 pages.

"Early Data Transmission over NAS," (XP051354959) 3GPP TSG-RAN WG2 #99bis, Prague, Czech Republic, Oct. 9-13, 2017, Agenda Item 9.14.2, Ericsson, R2-1710521, 6 pages.

3GPP TS 36.321, "3rd Generation Partnership Project; Technical Specification Group Radio Access Network; Evolved Universal Terrestrial Radio Access (E-UTRA); Medium Access Control (MAC) protocol specification (Release 15)", v15.0.0, Jan. 2018, 50 pages.

3GPP TS 36.213, "3rd Generation Partnership Project; Technical Specification Group Radio Access Network; Evolved Universal Terrestrial Radio Access (E-UTRA); Physical layer procedures (Release 15)", v15.0.0, Jan. 2018, 493 pages.

Jennings, C., et al., "Media Types For Sensor Measurement Lists (SenML)," Network Working Group, Internet-Draft (Dec. 14, 2017) https://tools.ietf.org/html/draft-ietf-core-senml-12, 47 pages.

3GPP TS 36.331, "3rd Generation Partnership Project; Technical Specification Group Radio Access Network; Evolved Universal Terrestrial Radio Access (E-UTRA); Radio Resource Control (RRC) protocol specification (Release 15)", v15.0.1, Jan. 2018, 776 pages.

\* cited by examiner

SENSOR-DATA BATCHING FOR EFFICIENT EARLY DATA

RELATED APPLICATIONS

This application is a continuation of U.S. patent application Ser. No. 16/975,596 filed on Aug. 25, 2020, which itself is a 35 U.S.C. § 371 national stage application of PCT International Application No. PCT/EP2019/054577 filed on Feb. 25, 2019, which in turns claims domestic priority to U.S. Provisional Patent Application No. 62/635,027, filed on Feb. 26, 2018, the disclosures and content of which are incorporated by reference herein in their entirety.

TECHNICAL FIELD

The present disclosure is related to wireless communication systems and more particularly to efficient early data for sensor data.

BACKGROUND

3GPP has (so far) specified two different air interfaces with targeted support for machine-type communications (i.e., IoT use cases). In Rel-13 (continued in Rel-14), both eMTC (or more broadly LTE-M) and NB-IoT UE types and procedures were specified, with corresponding UE categories (Cat-M1 and Cat-M2 for eMTC and Cat-NB1 and Cat-NB2 for NB-IoT). These UEs may operate within smaller bandwidths (eMTC with 6 PRBs/1.4 MHz and NB-IoT with 1 PRB/200 kHz) and support different kind of deployments in in-band of an existing deployment, in guard-bands (NB-IoT) or as a standalone system.

For both eMTC and NB-IoT one goal included adding support for coverage enhancements (CE). This may be achieved by various different methods. For example, one of the methods is repetitions over time so that enough energy can be collected over time to receive the signals even in bad coverage beyond the "cell edge" of GSM, 3G and traditional LTE cells. The repetition for different channels may be configured using RRC protocol, where the repetition factor to be used in a transmission is further indicated out of a set of configured values in downlink control information (DCI) when sending either downlink allocation or uplink grant to the UE.

With CE up to 164 dB maximum coupling loss (MCL) may be reached. The repetition factors and configuration used for the data channel transmissions for NB-IoT and eMTC can result in transmission times up to couple of seconds in the worst case (e.g. maximum repetition factor for eMTC is 2048, resulting in 2048 ms total transmission time). The size of data per one Transport Block (TB) varies (scheduler makes the decisions of the TB sizes based on channel conditions and other information) but can be as small as few tens of bits. Example sizes of typical eMTC and NB-IoT TBs may be in order of few hundred of bits. Small TBs combined with high repetition factor results in low data rates, however, when the coverage is better, the number of repetitions can be lower thus the data rate would be better in those cases. For many IoT applications with complex data models, the low throughput is not enough.

Cellular IoT devices may use the radio interface for both management and data. Management operations may consist of simple parameter changes and/or may need larger information transfer such as with firmware updates. Also with data, depending on the data model used, the device may choose to add variety of metadata to the messages or only bare minimum.

Sensor Measurement Lists (SenML) data format can be used to batch multiple measurements from an IoT sensor device into a single batch of data. SenML format also allows using varying level of metadata for each measurement or for the whole batch and provides multiple ways to encode the data (JSON, CBOR, EXI) with increasing level of encoding/decoding complexity but better compression.

Releases of 3GPP may specify Early Data Transmission (EDT). In EDT, the UE can transmit uplink data during the random-access procedure. In the current specifications, the earliest possibility to send data is in messages after the random-access procedure has been completed and RRC signaling connection has been established (i.e., Msg5). In practice, EDT for LTE-M and NB-IoT means that the UE may get opportunity to transmit user data already in the 3rd message (i.e., Msg3) in the random access procedure after the Random Access Preamble transmission and reception of Random Access Response (RAR) message. In EDT, the eNB does not know the volume or size of the data the UE has, thus the transmission resources it allocates to the UE may be larger than what would be required.

Brief reference is made to FIG. 1, which is a diagram illustrating a contention based random access procedure. In EDT, the UE will indicate in Msg1, i.e., with the transmission of Random Access Preamble if it intends or wishes to use EDT or not. For example, the used radio resources for Msg1 transmission, or the sequence used for Msg1 transmission, may indicate if the UE intends to use EDT or not. The eNB may respond with RAR message 2, which contains the uplink (UL) grant, which gives the uplink radio resources the UE should use for the transmission. If EDT is used, the UL grant can indicate Transmission Block Size (TBS) of up to 1000 bits, which the UE can use for transmission of uplink user data in Msg3. Part of this TBS may be used for signaling and may not be available for user data transmission. For example, around 20 bytes may be used for signaling.

The maximum possible TBS to be used for EDT in a cell is broadcasted in system information (SI) and thus is known by the UEs. This does not, however, guarantee that the eNB will always provide such TBS, but it might need to signal something else in the UL grant in RAR message depending on the radio conditions, system load, etc. This decision may typically be made in the scheduler in eNB.

In cases where the data to be sent is larger than the provided UL grant, the UE might need to do a fallback to legacy procedure. This may include resorting to the normal procedure where Msg3 includes signaling (such as RRC message and contention resolution identity) and the UE will send user data starting earliest in Msg5, i.e., after the random access procedure is completed and the UE has transitioned to RRC_CONNECTED state where data transmission can be done. It is undetermined regarding the UE being able to segment the data for transmission, for example, by sending part of the data in Msg3 and the rest in later messages.

Today a cellular IoT device that can use different variations of the data model (e.g., SenML) does not know when the radio resources provided for uplink data transmission over the air interface are sufficient to add possible metadata to the messages and when it would be better to not include such data.

SUMMARY

A method of operating a user equipment, UE, (100) that is operating in a network (120) includes determining (300)

whether the UE and/or an application (110) that is running on the UE is using or planning to use an early data transmission, EDT, to transmit sensor data via the network. Operations include responsive to determining that the UE and/or the application that is running on the UE is using or planning to use the EDT, informing (302) the application of configuration parameters corresponding to the EDT and altering (304), by the application and based on the configuration parameters corresponding to the EDT, properties of the sensor data that is provided to the UE for transmission to the network to include revised sensor data.

In some embodiments, altering properties of the sensor data includes changing a size of the data to be sent as the revised sensor data. Some embodiments provide that a Transport Block Size, TBS, corresponds to a size of the sensor data that the EDT uses in a single transmission and that the TBS is provided in System Information, SI, and/or in an Uplink, UL, grant. In some embodiments, a Transport Block Size, TBS, is calculated using System Information, SI. Some embodiments provide that the TBS includes a remaining portion that includes non-sensor data that corresponds to the application. In some embodiments, the non-sensor data includes protocol overhead data corresponding to the application.

In some embodiments, determining whether the UE and/or the application that is running on the UE is using or planning to use the EDT to transmit sensor data via the network includes monitoring, by the UE, the broadcast System Information, SI, for content that corresponds to the EDT. Some embodiments provide that the content that corresponds to the EDT includes content that is associated with the Transport Block Size, TBS, and/or a configuration corresponding to Physical Random Access Channel, PRACH, resources for the EDT.

In some embodiments, informing the application of configuration parameters corresponding to the EDT includes sending, to the application, information that is provided in an Up Link, UL, grant in a Random Access Response, RAR, message. Some embodiments provide that information that is provided in an Up Link, UL, grant in a Random Access Response, RAR, message includes a maximum quantity of data that the UE can include in the EDT in the single transmission. In some embodiments, informing the application of configuration parameters corresponding to the EDT includes sending, to the application, information that corresponds to previous EDT transmissions and previous UL grants corresponding to previous EDT's. In some embodiments, altering, by the application, properties of the sensor data that is provided to the UE for transmission to the network to include revised sensor data includes estimating a predicted Transport Block, TB, and adapting future EDT sizes for future EDT's.

Some embodiments include sending, by the application, a query to lower layers and receiving TBS information via an Application Program Interface, API. In some embodiments, altering, by the application, properties of the sensor data that is provided to the UE for transmission to the network to include revised sensor data includes omitting non-essential metadata from data objects corresponding to the revised sensor data. Some embodiments provide that non-essential metadata includes Sensor Measurement List, SenML, records including a pointer for further information about measurements and/or configuration parameters. In some embodiments, non-essential metadata includes Sensor Measurement List, SenML, records including less than a total number of records by using a lower sampling resolution.

Some embodiments provide that altering, by the application, properties of the sensor data that is provided to the UE for transmission to the network to include revised sensor data includes choosing between different encodings to adjust behavior for the TBS.

In some embodiments, the application includes multiple layers of versions of sensor data to be transmitted and each of the layers includes a different size of EDT message for transmission.

Some embodiments are directed to a first communication node (600) that is adapted to perform according to any operations described herein.

Some embodiments are directed to a first communication node (600) that includes a network interface (607) configured to communicate with a second network node via an access network and a processor (603) coupled to the network interface and configured to perform operations described herein. Operations may include determining (300) whether the first communication node and/or an application (110) that is running on the first communication node is using or planning to use an early data transmission, EDT, to transmit sensor data via the network and, responsive to determining that the first communication node and/or the application that is running on the first communication node is using or planning to use the EDT, informing (302) the application of configuration parameters corresponding to the EDT. Operations may further include altering (304), by the application and based on the configuration parameters corresponding to the EDT, properties of the sensor data that is provided to the first communication node for transmission to the network to include revised sensor data.

In some embodiments, n altering properties of the sensor data comprises changing a size of the data to be sent as the revised sensor data. In some embodiments, a Transport Block Size, TBS, corresponds to a size of the sensor data that the EDT uses in a single transmission and the TBS is provided in System Information, SI, and/or in an Uplink, UL, grant. Some embodiments provide that a Transport Block Size, TBS, is calculated using System Information, SI. Some embodiments provide that the TBS includes a remaining portion that includes non-sensor data that corresponds to the application. In some embodiments, the non-sensor data includes protocol overhead data corresponding to the application.

Some embodiments provide that determining whether the UE and/or the application that is running on the UE is using or planning to use the EDT to transmit sensor data via the network includes monitoring, by the UE, the broadcast System Information, SI, for content that corresponds to the EDT. Some embodiments provide that the content that corresponds to the EDT includes content that is associated with the Transport Block Size, TBS, and/or a configuration corresponding to Physical Random Access Channel, PRACH, resources for the EDT.

In some embodiments, informing the application of configuration parameters corresponding to the EDT includes sending, to the application, information that is provided in an Up Link, UL, grant in a Random Access Response, RAR, message. Some embodiments provide that information that is provided in an Up Link, UL, grant in a Random Access Response, RAR, message includes a maximum quantity of data that the UE can include in the EDT in the single transmission. Some embodiments provide that informing the application of configuration parameters corresponding to the EDT includes sending, to the application, information that corresponds to previous EDT transmissions and previous UL grants corresponding to previous EDT's. In some embodiments, altering, by the application, properties of the sensor data that is provided to the UE for transmission to the network to include revised sensor data includes estimating a predicted Transport Block, TB, and adapting future EDT sizes for future EDT's. Some embodiments include sending, by the application, a query to lower layers and receiving TBS information via an Application Program Interface, API.

In some embodiments, altering, by the application, properties of the sensor data that is provided to the UE for transmission to the network to include revised sensor data includes omitting non-essential metadata from data objects corresponding to the revised sensor data. Some embodiments provide that non-essential metadata includes Sensor Measurement List, SenML, records including a pointer for further information about measurements and/or configuration parameters. In some embodiments, non-essential metadata includes Sensor Measurement List, SenML, records including less than a total number of records by using a lower sampling resolution.

Some embodiments provide that altering, by the application, properties of the sensor data that is provided to the UE for transmission to the network to include revised sensor data includes choosing between different encodings to adjust behavior for the TBS. In some embodiments, the application includes a plurality of layers of versions of sensor data to be transmitted, wherein each of the plurality of layers includes a different size of EDT message for transmission.

Some embodiments provide that the processor is adapted to perform operations according to any embodiments described herein.

Some embodiments are directed to a first communication node (600) that includes respective modules adapted to perform operations according to any embodiments described herein.

Some embodiments are directed to methods of operating a first communication node (600). Such methods may include sending (400), to a User Equipment, UE, data that includes information that the UE uses to determine whether the UE and/or an application that is running on the UE is using or planning to use an early data transmission, EDT, to transmit sensor data via the network and, responsive to the UE determining that the UE and/or the application that is running on the UE is using or planning to use the EDT, receiving (402) data from the UE that includes a data content corresponding to configuration parameters of the EDT.

Some embodiments are directed to a first communication node (600) that includes a network interface (607) configured to communicate with a user Equipment, UE (500), via an access network and a processor (603) coupled to the network interface. The processor may be configured to perform operations including sending (400), to the UE, data that includes information that the UE uses to determine whether the UE and/or an application that is running on the UE is using or planning to use an early data transmission, EDT, to transmit sensor data via the network and, responsive to the UE determining that the UE and/or the application that is running on the UE is using or planning to use the EDT, receiving (402) data from the UE that includes a data content corresponding to configuration parameters of the EDT.

Some embodiments are directed to a first communication node (600) that includes respective modules adapted to perform operations according to any embodiments herein.

Some embodiments are directed to a user equipment (500), UE, that includes a transceiver (501) configured to communicate with a first network node (600) via a radio access network and a processor (503) coupled to the transceiver. The processor may be configured to perform operations including determining (300) whether the UE and/or an application that is running on the UE is using or planning to use an early data transmission, EDT, to transmit sensor data via the network, responsive to determining that the UE and/or the application that is running on the UE is using or planning to use the EDT, informing (302) the application of configuration parameters corresponding to the EDT, and altering (304), by the application, properties of the sensor data that is provided to the UE for transmission to the network to include revised sensor data.

Some embodiments are directed to a user equipment (500), UE, including respective modules adapted to perform operations described herein. Some embodiments are directed to a user equipment (500), UE, including respective modules adapted to perform operations described herein.

BRIEF DESCRIPTION OF THE DRAWINGS

The accompanying drawings, which are included to provide a further understanding of the inventive concepts and are incorporated in and constitute a part of this application, illustrate certain embodiment(s) of the inventive concepts. In the drawings.

DESCRIPTION OF EMBODIMENTS

Figure 1:
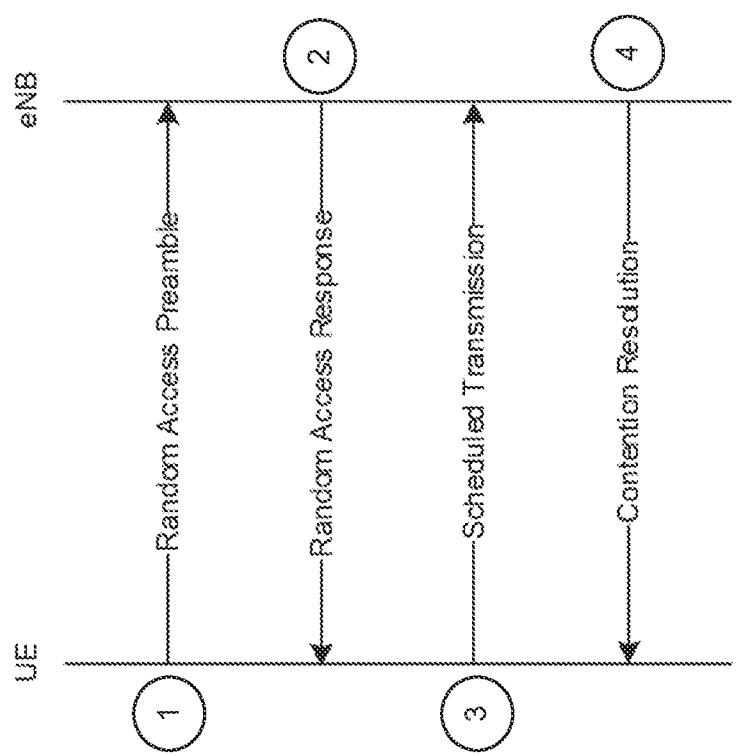
FIG. 1 is a diagram illustrating a contention based random access procedure.

To achieve better battery life for the device and less interference in the cellular system it would be advantageous to adapt the used data model to the cell conditions.

With EDT, the eNB typically doesn't know what the uplink data size the UE is about to send is. Thus, it does not know what the most efficient way would be to grant use of uplink radio resources, i.e., what size of uplink grant it should send to the UE in Msg2. It may depend on different possible eNB implementation and the granting mechanism.

In EDT the UE should send all data in one transmission block (TB), thus the eNB may try to over-dimension the grant sizes for EDT cases. This means that in case the UE has smaller uplink data to send (e.g. ~100 bits when eNB provides grant for 1000 bits), the UE may use padding to fill up the provided grant space, which may result in poor resource utilization and spectral efficiency.

As disclosed herein, an application running in the UE may adapt its behavior based on information regarding whether the UE uses or intends to use Early Data Transmission, and/or based on the size of the provided uplink resources (UL grant). The behavior may include changing the volume and/or the type of the data being sent. For example, some embodiments provide that the application may benefit from sending optional metadata together with data. However, the application may omit the metadata if, for example, all of the data would not fit in the provided uplink resources in a single transmission.

The software application running in the UE will adapt its behavior and the size of the sent data based on if Early Data Transmission is used or not. This may result in better use of the radio resources, i.e., higher spectral efficiency and potentially lower UE power consumption.

Some embodiments described herein may include methods that may be implemented by a UE in a wireless network. In some embodiments, the UE may include an IoT-type UE in a 3GPP network based on LTE (LTE-M) and/or NB-IoT technologies, however, such embodiments are not limited to the type of UE, the type of network or the type of communication technologies. For example, similar embodiments may be seen to be used in other types of wireless networks as well, especially in new radio (NR) or 5G networks.

Provided herein are methods for a wireless communication device to adapt the application behavior based on the Early Data Transmission (EDT) Transport Block Size (TBS) and/or other parameters defining the size of granted uplink resources. A data model with adjustable packet size, based on amount of included metadata, number of measurements/ parameters, and compression technique, may be used to adapt to the given TBSs for optimal usage.

According to some embodiments, methods in a UE and/or applications running in the UE may perform operations that include: determining if EDT is being or going to be used, and/or the configuration parameters of EDT if used; informing the application of the above information; and altering the application behavior based on the above information. Some embodiments provide that the properties such as the size of the data to be sent towards the network could be changed based on EDT information.

In below embodiments we refer to Transport Block Size (TBS) as the size of data that is transmitted over the air. In practice, this can be understood as the TBS given in SI and/or signaled in UL grant. Some embodiments provide that the remaining part of the TBS can be used for application data (i.e. the TBS—protocol overhead), or similar indication of the data volume that could be transmitted in one transmission using EDT.

In some embodiments, the determination of whether EDT is being used may be obtained by the UE listening to broadcast system information (SI). For example, the maximum TBS to be used for EDT may be sent in SI, and the configuration of the PRACH resources for EDT may be sent in SI. Based on either or both of this broadcast information the UE may know whether or not EDT may be used in the cell.

In some embodiments, part of the information provided in the UL grant in the RAR message may be sent to the application. For example, information of the TBS signaled in UL grant tells how much data the UE can include in the transmission without fallback. Stated differently, the information of the TBS signaled in the UL grant may include data corresponding to the maximum data size that the UE can send in one transmission.

In some embodiments, the application is given information based on previous transmissions and the previous UL grants (e.g. the TB sizes) it has received for EDT. Based on this information the application may predict a future TB size and act according to that, for example by adapting the future data sizes in advance.

In a variant of the above two embodiments, the application may send a query to lower layers and may receive TBS information through an API.

In some embodiments, if the UE has information about the grant size and/or the TBS, the UE can choose to include/omit useful but not essential pieces of metadata from the data objects that it is sending. For example, in SenML the Records may contain a pointer for further information about the measurements/configuration parameters. This information may be delivered with the Link extension. In some embodiments, the links may be tens of bytes of data and hence can consume a large fraction of the TB. Also, in SenML a device can choose how many Records to include in a single Pack. With a small TBS, the device can choose to, for example, lower a sampling resolution and include only every second measurement in the Pack, which may be indicated with the corresponding time values. In some embodiments, the device may choose to include only the optimal amount of Records for each Pack to fill the whole TB. The device may also choose between different encodings to adjust its behavior for the TBS. With EXI encoding, better compression may be achieved. However, such encoding may increase encoding/decoding complexity compared to the CBOR/JSON encoding.

In some embodiments, the application may provide the lower layers with multiple versions of the data to be transmitted over the air. In some embodiments, the multiple versions may have different sizes. The lower layers may then decide which version to send based on the available uplink resource, for example, the granted TBS.

In some embodiments, the information from the radio modem receiving and interpreting the UL grant to the application layer is implemented as a communication between the protocol layers that is not standardized. In some embodiments, the information between protocol layers is provided and read through a standardized API.

Figure 2:
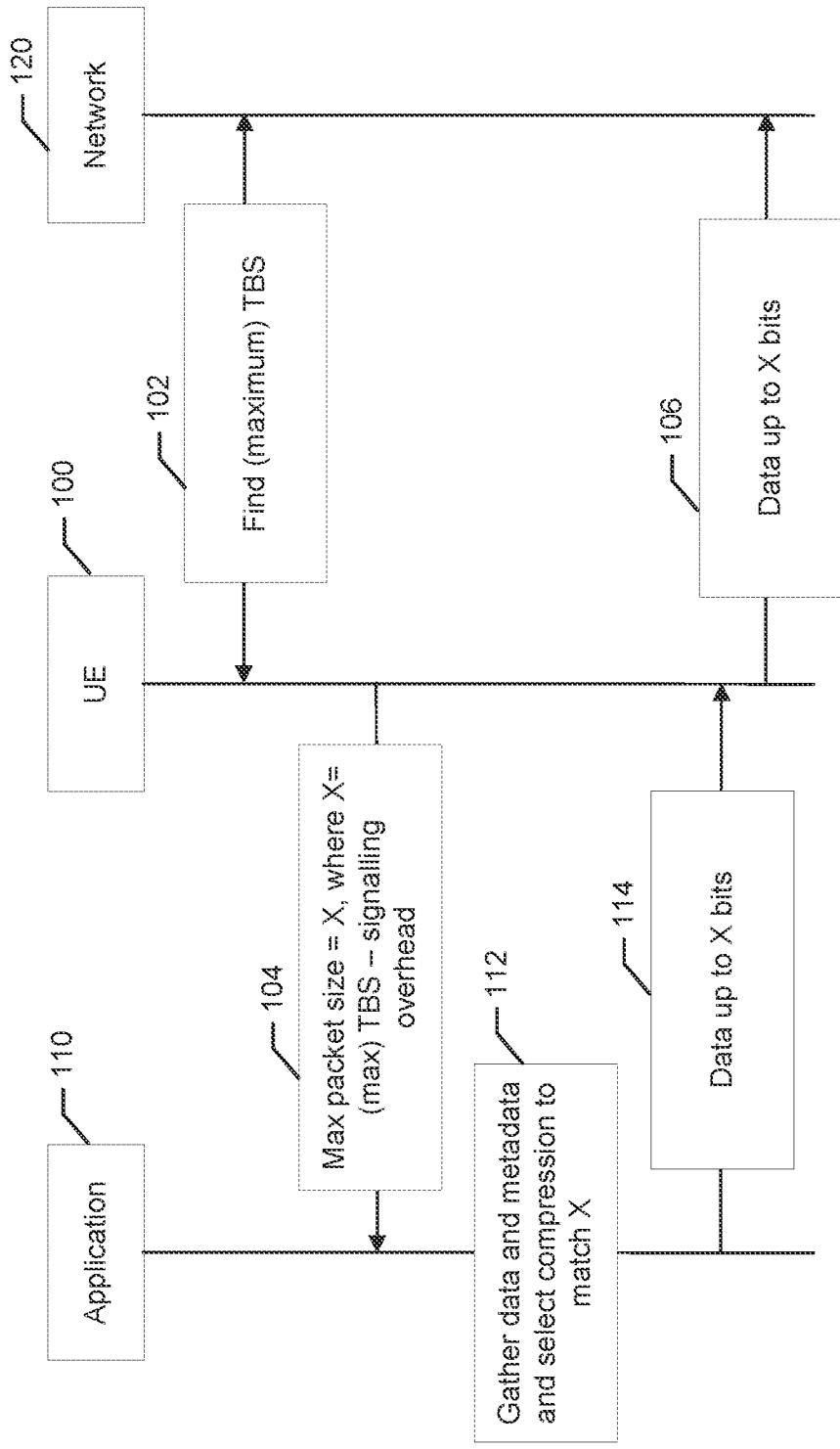
FIG. 2 is a schematic block diagram illustrating data flow operations corresponding to some embodiments of the present invention.

Reference is now made to FIG. 2, which is a schematic block diagram illustrating data flow operations corresponding to some embodiments of the present invention. As illustrated, the UE 100 may determine (block 102) the maximum transport block size from the network 120. Some embodiments provide that the UE 100 may send a request for the maximum TBS to the network 120, while other embodiments provide that the UE 100 determines the maximum TBS using other data provided by the network 120, including, for example, SI and/or the UL grant, among others.

The UE 100 may provide data corresponding to the maximum data packet size for an EDT to the application 110 that is running on the UE 100. In some embodiments, the maximum data packet size may be a value that is less than the maximum TBS. For example, the maximum packet data size may be determined (block 104) as a difference between the maximum TBS and a portion of the data corresponding to signaling overhead data.

The application 110 may gather (block 112) the data and metadata and select a compression to match the maximum data packet size value that was provided by the UE 100. Data up to the maximum TBS may be provided (block 114) to the UE 100 by the application 110 and may be sent (block 106) by the UE 100 to the network 120.

Figure 3:
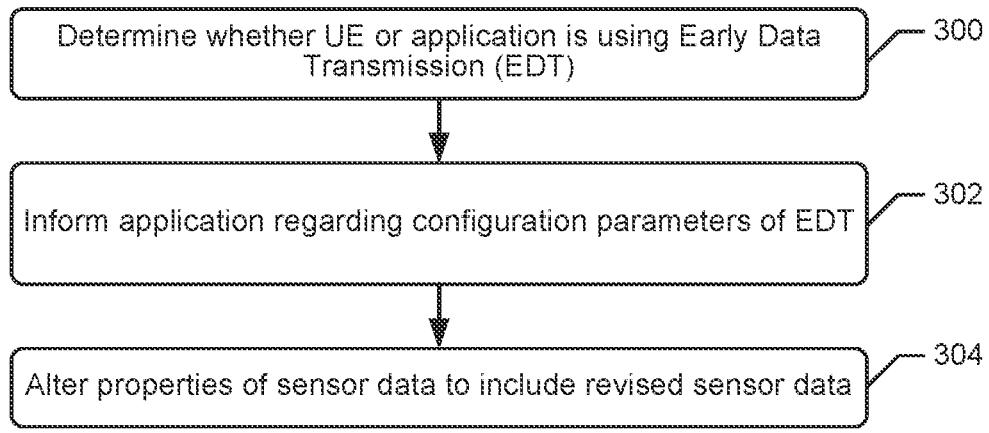
FIG. 3 is a schematic flow diagram illustrating operations according to some embodiments disclosed herein.

Reference is now made to FIG. 3, which is a schematic flow diagram illustrating operations according to some embodiments disclosed herein. Operations may include determining whether the UE and/or an application that is running on the UE is using or planning to use an early data transmission (EDT) to transmit sensor data via the network (block 300). Although described herein as sensor data, any type of data generated by any type of application running on a UE is within the scope and spirit of this disclosure. For example, embodiments may include data corresponding to any one of the different types of data provided by Internet of Things (IoT) type devices, including machine-to-machine devices, among others.

In some embodiments, altering properties of the sensor data may include changing a size of the data to be sent as the revised sensor data. Some embodiments provide that a Transport Block Size (TBS) corresponds to a size of the sensor data that the EDT uses in a single transmission and that the TBS may be provided in System Information (SI) and/or in an Uplink (UL) grant. In some embodiments, the TBS includes a remaining portion that includes non-sensor data that corresponds to the application. Some examples of non-sensor data may include protocol overhead data corresponding to the application, among others.

In some embodiments, determining whether the UE and/or the application that is running on the UE is using or planning to use the EDT includes monitoring, by the UE, the broadcast System Information (SI) for content that corresponds to the EDT. In some embodiments, the content that corresponds to the EDT includes content that is associated with the Transport Block Size (TBS) and/or a configuration corresponding to Physical Random Access Channel (PRACH) resources for the EDT.

Responsive to determining that the UE and/or the application that is running on the UE is using or planning to use the EDT, operations may further include informing the application of configuration parameters corresponding to the EDT (block 302). In some embodiments, informing the application of configuration parameters corresponding to the EDT includes sending, to the application, information that is provided in an Up Link (UL) grant in a Random Access Response (RAR) message. Some embodiments provide that information that is provided in an Up Link (UL) grant in a Random Access Response (RAR) message includes a maximum quantity of data that the UE can include in the EDT in the single transmission.

In some embodiments, informing the application of configuration parameters corresponding to the EDT includes sending, to the application, information that corresponds to previous EDT transmissions and previous UL grants corresponding to previous EDT's.

Some embodiments include altering, by the application and based on the configuration parameters corresponding to the EDT, properties of the sensor data that is provided to the UE for transmission to the network to include revised sensor data (block 304). In some embodiments, altering properties of the sensor data that is provided to the UE for transmission to the network to include revised sensor data includes estimating a predicted Transport Block (TB) and adapting future EDT sizes for future EDT's. Some embodiments include sending, by the application, a query to lower layers and receiving TBS information via an Application Program Interface (API).

In some embodiments, altering properties of the sensor data that is provided to the UE for transmission to the network to include revised sensor data includes omitting non-essential metadata from data objects corresponding to the revised sensor data. In some embodiments, non-essential metadata includes Sensor Measurement List (SenML) records including a pointer for further information about measurements and/or configuration parameters. Some embodiments provide non-essential metadata includes Sensor Measurement List (SenML) records comprising less than a total number of records by using a lower sampling resolution.

In some embodiments, altering properties of the sensor data that is provided to the UE for transmission to the network to include revised sensor data includes choosing between different encodings to adjust behavior for the TBS.

Some embodiments provide that the application includes multiple layers of versions of sensor data to be transmitted. In some embodiments, each of the layers includes a different size of EDT message for transmission.

Figure 4:
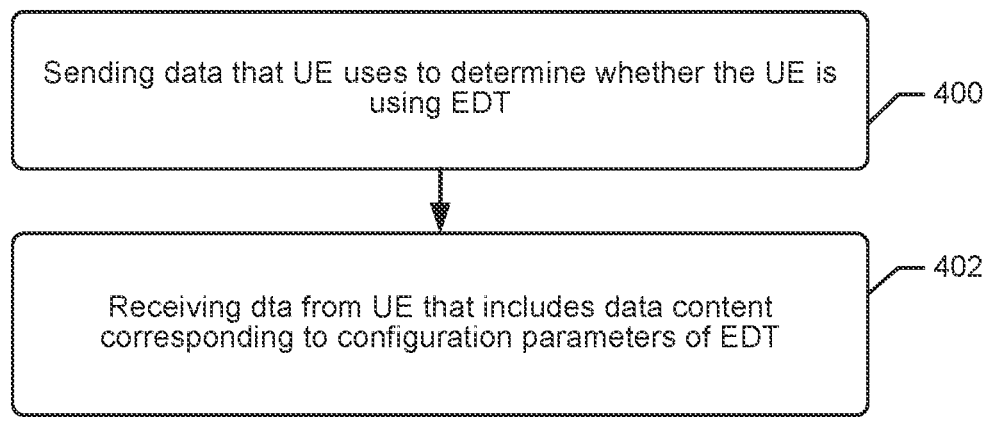
FIG. 4 is a schematic flow diagram illustrating operations according to some embodiments disclosed herein.

Reference is now made to FIG. 4, which is a schematic flow diagram illustrating operations according to some embodiments disclosed herein. Methods of operating a first communication node may include sending, to a User Equipment (UE), data that includes information that the UE uses to determine whether the UE and/or an application that is running on the UE is using or planning to use an early data transmission (EDT) to transmit sensor data via the network (block 400). In response to the UE determining that the UE and/or the application that is running on the UE is using or planning to use the EDT, operations include receiving data from the UE that includes a data content corresponding to configuration parameters of the EDT (block 402).

Example Elements of UE and Network Node

Figure 5:
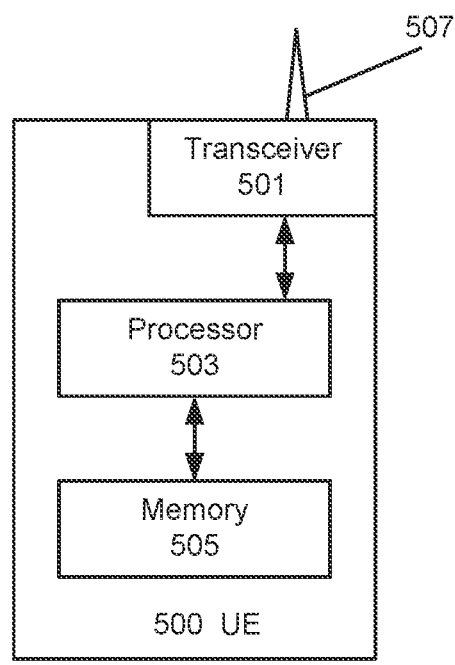
FIG. 5 is a block diagram illustrating elements of a UE (also referred to as a wireless terminal, a mobile equipment (ME), a wireless communication device, a wireless communication terminal, user equipment, a user equipment node/terminal/device, etc.) configured to operate according to embodiments disclosed herein.

FIG. 5 is a block diagram illustrating elements of a UE 500 (also referred to as a wireless terminal, a mobile equipment (ME), a wireless communication device, a wireless communication terminal, user equipment, a user equipment node/terminal/device, etc.) configured to operate according to embodiments disclosed herein. As shown, the UE 500 may include at least one antenna 507 (also referred to as antenna), and at least one transceiver circuit 501 (also referred to as transceiver) including a transmitter and a receiver configured to provide uplink and downlink radio communications with a base station or other radio transceiver element of a radio access network. The UE 500 may also include at least one processor circuit 503 (also referred to as processor) coupled to the transceiver 501, and at least one memory circuit 505 (also referred to as memory) coupled to the processor 503. The memory 505 may include computer readable program code that when executed by the processor 503 causes the processor 503 to perform operations according to embodiments disclosed herein for a UE. According to other embodiments, processor 503 may be defined to include memory so that a separate memory circuit is not required. The UE 500 may also include an interface (such as a user interface) coupled with processor 503.

As discussed herein, operations of the UE 500 may be performed by processor 503 and/or transceiver 501. Alternatively, or additionally, the UE 500 may include modules, e.g., software and/or circuitry, that performs respective operations (e.g., operations discussed herein with respect to example embodiments of UEs).

Figure 6:
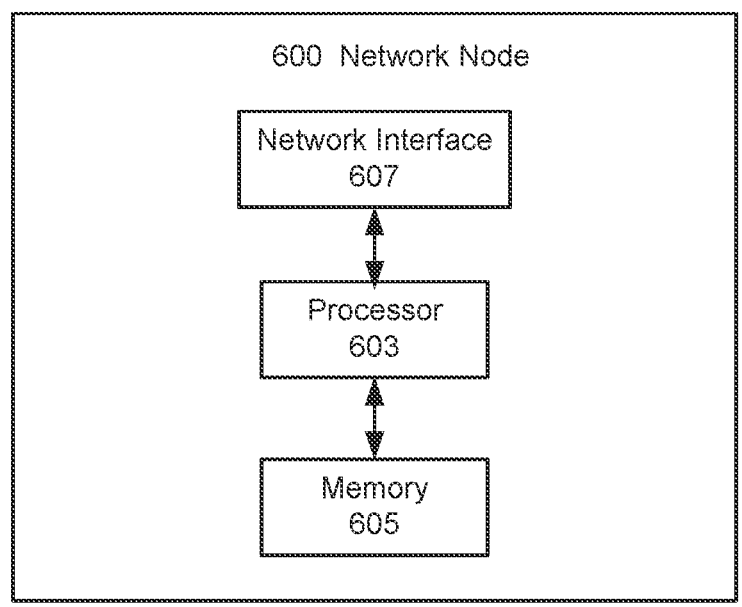
FIG. 6 is a block diagram illustrating elements of a network node 600 according to one or more embodiments disclosed herein.

FIG. 6 is a block diagram illustrating elements of a network node 600 according to one or more embodiments disclosed herein. As shown, the network node 600 may include at least one network interface circuit 607 (also referred to as a network interface) configured to provide communications with other network nodes, such as one or more nodes of a access network, a core network, and/or another system node. The network node 600 may also include at least one processor circuit 603 (also referred to as a processor) coupled to the network interface 607, and at least one memory circuit 1605 (also referred to as memory) coupled to the processor 603. The memory 605 may include computer readable program code that when executed by the processor 603 causes the processor 603 to perform operations according to embodiments disclosed herein for a network node. According to other embodiments, processor 603 may be defined to include memory so that a separate memory circuit is not required.

As discussed herein, operations of the network node 600 may be performed by processor 603 and/or network interface 607. For example, processor 603 may control network interface 607 to send communications through network interface 607 to one or more other network nodes and/or other system nodes, and/or to receive communications through network interface 607 from one or more other network nodes and/or other system nodes. Alternatively, or additionally, the network node 600 may include modules, e.g., circuitry, that performs respective operations (e.g., operations discussed herein with respect to example embodiments of network nodes).

In some embodiments, some or all of the operations described herein may be implemented as virtual components executed by one or more virtual machines implemented in one or more virtual environments hosted by one or more of network nodes. Further, in embodiments in which the virtual node is not a radio access node or does not require radio connectivity (e.g., a core network node), then the network node may be entirely virtualized.

The operations may be implemented by one or more applications (which may alternatively be called software instances, virtual appliances, network functions, virtual nodes, virtual network functions, etc.) operative to implement some of the features, functions, and/or benefits of some of the embodiments disclosed herein. Applications are run in a virtualization environment which provides hardware comprising processing circuitry and memory. Memory contains instructions executable by processing circuitry whereby application is operative to provide one or more of the features, benefits, and/or functions disclosed herein.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
AKA Authentication and Key Agreement protocol
AMF Access and Mobility Management Function
AN Access Network
API Application Program Interface
ARQ Automatic Repeat Request
AUSF Authentication Server Function
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CN Core Network
CP Cyclic Prefix
CPICH Common Pilot Channel
CPICH Ec/No CPICH Received energy per chip divided by the power density in the band
CQI Channel Quality information
C-RNTI Cell RNTI
CRS Cell-specific Reference Signal
CSI Channel State Information
DCCH Dedicated Control Channel
dB Decibel
DL Downlink
DM Demodulation
DMRS Demodulation Reference Signal
DRX Discontinuous Reception
DTX Discontinuous Transmission
DTCH Dedicated Traffic Channel
DUT Device Under Test
EAP Extensible Authentication Protocol
E-CID Enhanced Cell-ID (positioning method)
ECIES Elliptic Curve Integrated Encryption Scheme
EDT Early Data Transmission
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HPLMN Home PLMN
HSPA High Speed Packet Access
HRPD High Rate Packet Data
LOS Line of Sight
LPP LTE Positioning Protocol
LTE Long-Term Evolution
LTE-M LTE Machine-type Communications
MAC Medium Access Control
MBMS Multimedia Broadcast Multicast Services
MBSFN Multimedia Broadcast multicast service Single Frequency Network
MBSFN ABS MBSFN Almost Blank Subframe
MCL Maximum Coupling Loss
MDT Minimization of Drive Tests
MIB Master Information Block
MITM Man In The Middle
MME Mobility Management Entity
MSC Mobile Switching Center
NAS Non-Access Stratum NB-IoT Narrowband Internet of Things
NPDCCH Narrowband Physical Downlink Control Channel
NPBCH Narrowband Physical Broadcast CHannel
NPDSCH Narrowband Physical Downlink Shared CHannel
NPRACH Narrowband Physical Random Access CHannel
NPUSCH Narrowband Physical Uplink Shared CHannel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRB Physical resource Block
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAR Random Access Response
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SEAF Security Anchor Function
SenML Sensor Measurement Lists
SFN System Frame Number
SGW Serving Gateway
SI System Information
SIB System Information Block
SMC Security Mode Command
SNR Signal to Noise Ratio
SON Self Optimized Network
SPDCCH Short Physical Downlink Control Channel
SPDSCH Short Physical Downlink Shared Channel
SPUCCH Short Physical Uplink Control Channel
SPUSCH Short Physical Uplink Shared Channel
SS Synchronization Signal
SSS Secondary Synchronization Signal
SUCI Subscription Concealed Identifier
SUPI Subscription Permanent Identifier
TB Transport Block
TBS Transport Block Size
TDD Time Division Duplex
TDOA Time Difference of Arrival
TOA Time of Arrival
TSS Tertiary Synchronization Signal
TTI Transmission Time Interval
UE User Equipment
UICC Universal Integrated Circuit Card
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
VPLMN Visited PLMN
WCDMA Wide CDMA
WLAN Wide Local Area Network

FURTHER DEFINITIONS AND EMBODIMENTS

In this disclosure a receiving node and a transmitting node is referred to. In the embodiments in one example the transmitting node can be a UE and the receiving node can be a network node. In another example the transmitting node can be a network node and the receiving node can be a UE. In yet another example the transmitting and receiving node can be involved in direct device to device communication, that is both can be considered UEs. Examples of device to device communication are proximity service (ProSe), ProSe direct discovery, ProSe direct communication, V2X (where X can denote V, I or P e.g. V2V, V2I, V2P etc) etc.

A network node is a more general term and can correspond to any type of radio network node or any network node, which communicates with a UE and/or with another network node. Examples of network nodes are NodeB, base station (BS), multi-standard radio (MSR) radio node such as MSR BS, eNodeB, gNodeB. MeNB, SeNB, network controller, radio network controller (RNC), base station controller (BSC), road side unit (RSU), relay, donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC) etc.

Another example of a node could be user equipment, this is a non-limiting term user equipment (UE) and it refers to any type of wireless device communicating with a network node and/or with another UE in a cellular or mobile communication system. Examples of UE are target device, device to device (D2D) UE, V2X UE, ProSe UE, machine type UE or UE capable of machine to machine (M2M) communication, PDA, iPAD, Tablet, mobile terminals, smart phone, laptop embedded equipped (LEE), laptop mounted equipment (LME), USB dongles etc.

The term radio access technology, or RAT, may refer to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

The term signal used herein can be any physical signal or physical channel. Examples of downlink physical signals are reference signal such as PSS, SSS, CRS, PRS, CSI-RS, DMRS, NRS, NPSS, NSSS, SS, MBSFN RS etc. Examples of uplink physical signals are reference signal such as SRS, DMRS etc. The term physical channel (e.g., in the context of channel reception) used herein is also called as 'channel. The physical channel carries higher layer information (e.g. RRC, logical control channel etc). Examples of downlink physical channels are PBCH, NPBCH, PDCCH, PDSCH, sPDSCH, MPDCCH, NPDCCH, NPDSCH, E-PDCCH etc. Examples of uplink physical channels are sPUCCH. sPUSCH, PUSCH, PUCCH, NPUSCH, PRACH, NPRACH etc.

The term time resource used herein may correspond to any type of physical resource or radio resource expressed in terms of length of time and/or frequency. Signals are transmitted or received by a radio node over a time resource. Examples of time resources are: symbol, time slot, subframe, radio frame, TTI, interleaving time, etc.

Figure 7:
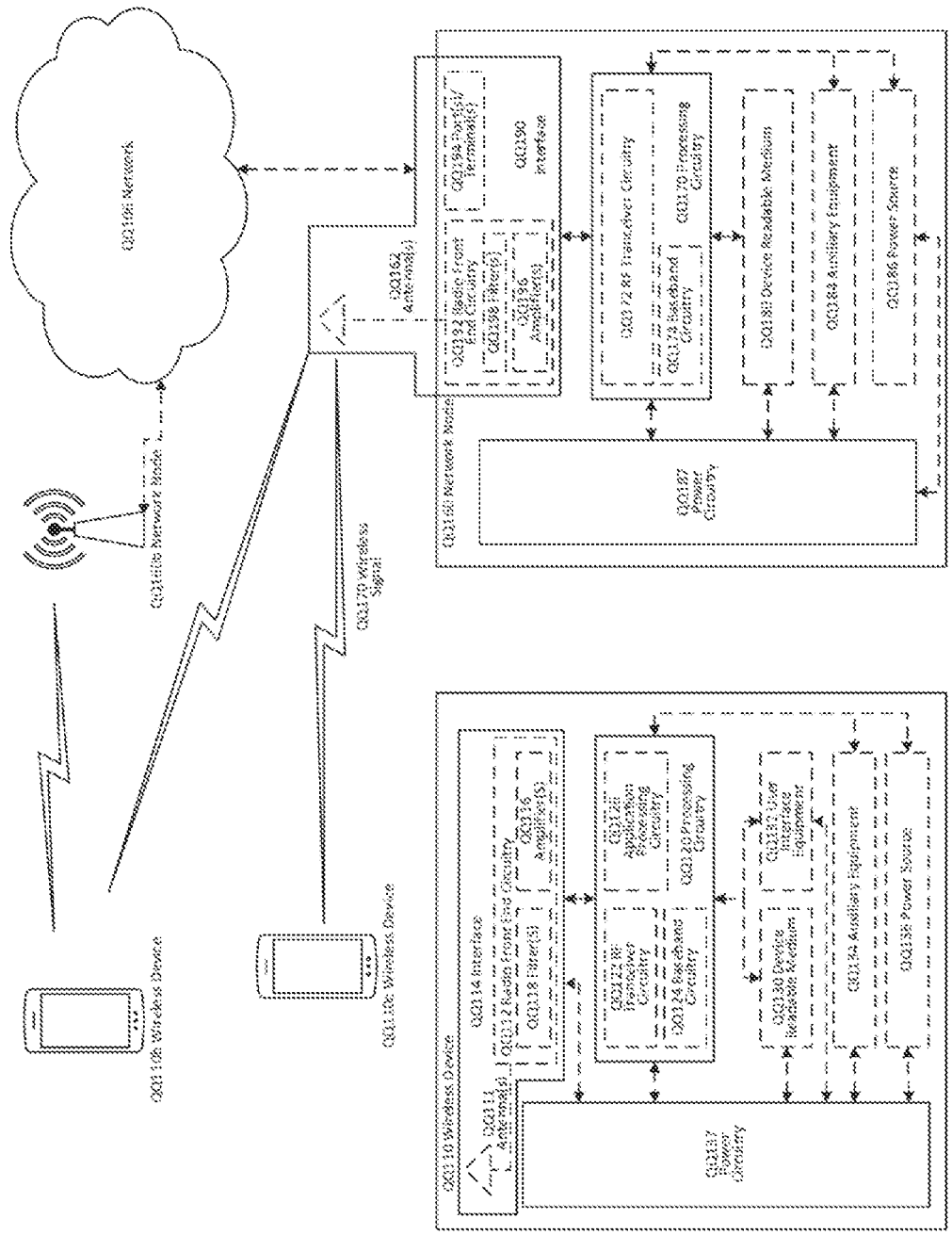
FIG. 7 is a schematic block diagram illustrating a wireless network according to embodiments herein.

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 7 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE) and mobile equipment (ME). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to the power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 8:
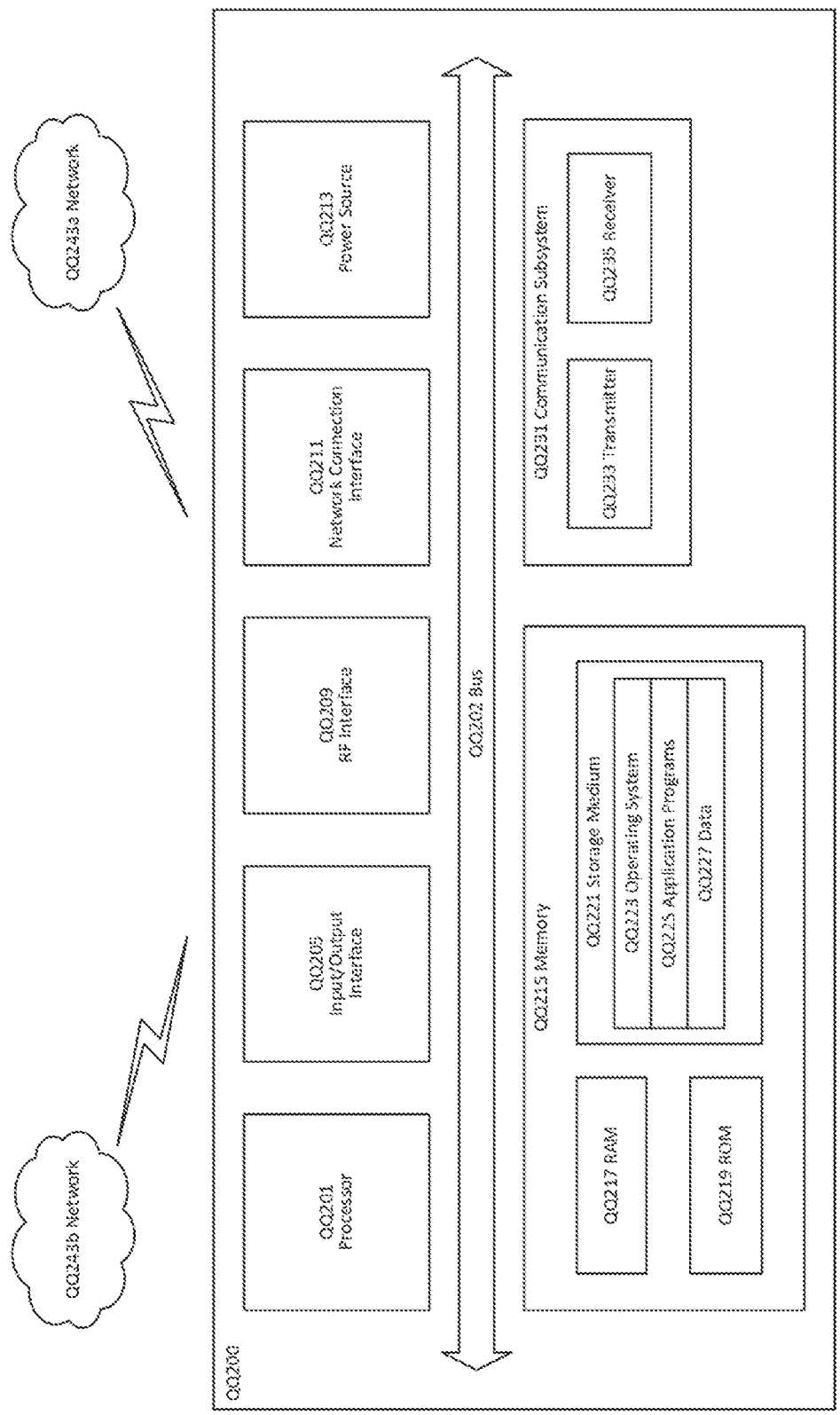
FIG. 8 illustrates one embodiment of a UE in accordance with various aspects described herein.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 8, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 8, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 9:
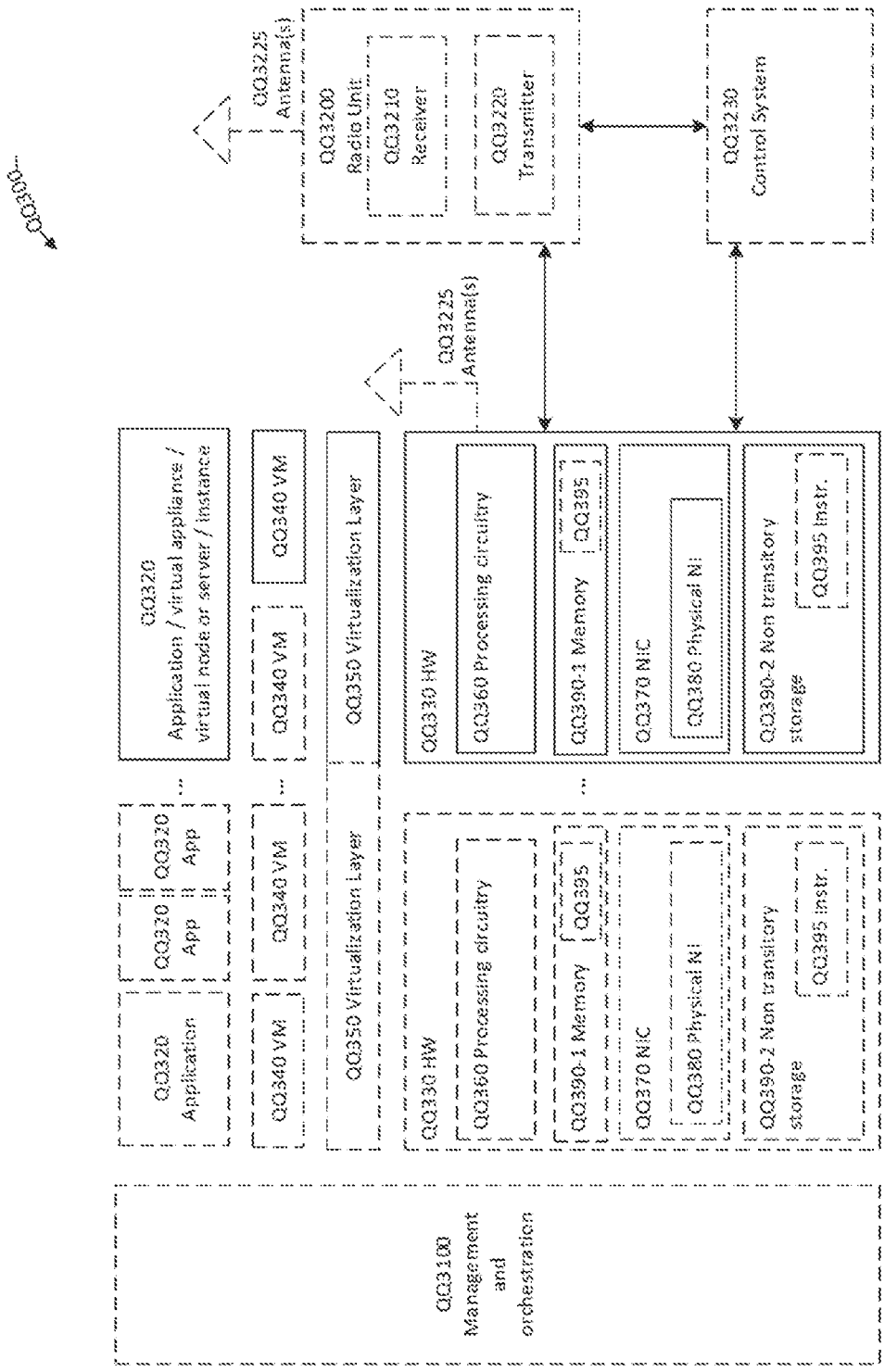
FIG. 9 is a schematic block diagram illustrating a virtualization environment in which operations implemented by some embodiments herein may be virtualized.

FIG. 9 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 9, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 9.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signaling can be effected with the use of control system QQ3230 which may alternatively be used for communication between the hardware nodes QQ330 and radio units QQ3200.

Figure 10:
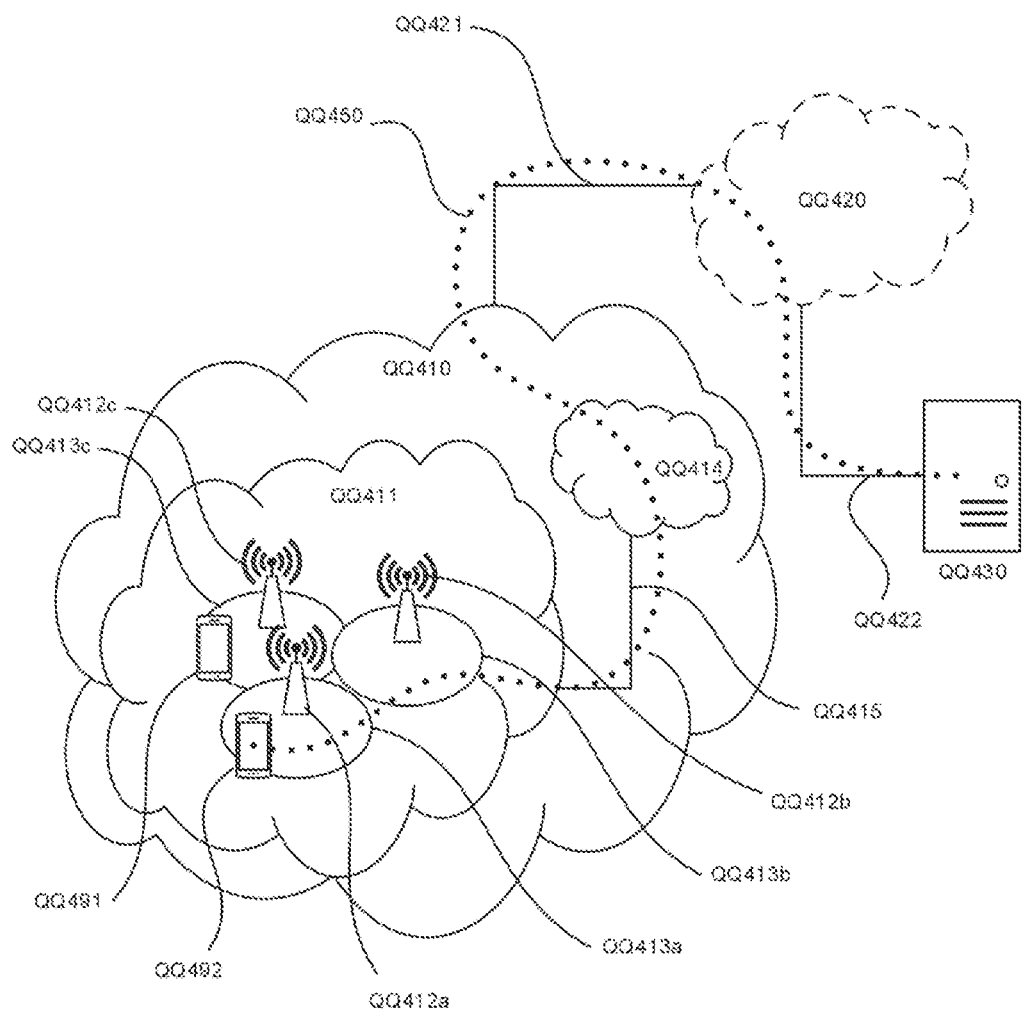
FIG. 10 is a schematic block diagram illustrating a communication system that includes a telecommunication network in which operations according to some embodiments herein may be performed.

With reference to FIG. 10, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 10 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 11. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 11) served by base station QQ520. Communication interface QQ526 may be configured to facilitate connection QQ560 to host computer QQ510. Connection QQ560 may be direct or it may pass through a core network (not shown in FIG. 11) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 11:
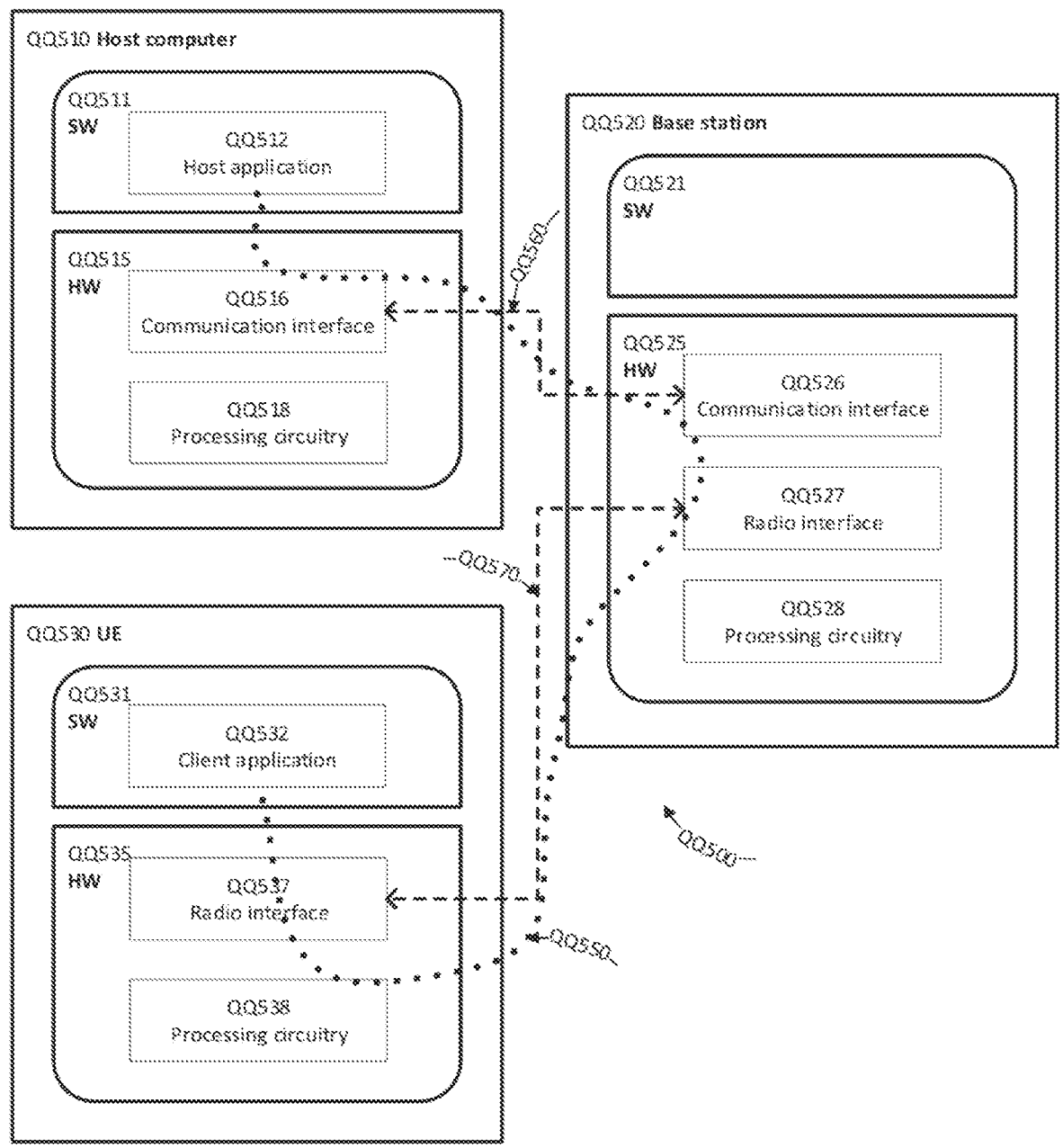
FIG. 11 is a schematic block diagram illustrating a UE, base station and host computer in accordance with some embodiments described herein.

It is noted that host computer QQ510, base station QQ520 and UE QQ530 illustrated in FIG. 11 may be similar or identical to host computer QQ430, one of base stations QQ412a, QQ412b, QQ412c and one of UEs QQ491, QQ492 of FIG. 10, respectively. This is to say, the inner workings of these entities may be as shown in FIG. 11 and independently, the surrounding network topology may be that of FIG. 10.

In FIG. 11, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

LISTING OF EXAMPLE EMBODIMENTS

1. A method of operating a user equipment (UE) that is operating in a network, the method comprising:
   determining whether the UE and/or an application that is running on the UE is using or planning to use an early data transmission (EDT) to transmit sensor data via the network;
   responsive to determining that the UE and/or the application that is running on the UE is using or planning to use the EDT, informing the application of configuration parameters corresponding to the EDT; and
   altering, by the application and based on the configuration parameters corresponding to the EDT, properties of the sensor data that is provided to the UE for transmission to the network to include revised sensor data.
2. The method of Embodiment 1, wherein altering properties of the sensor data comprises changing a size of the data to be sent as the revised sensor data.
3. The method of any of Embodiments 1-2, wherein a Transport Block Size (TBS) corresponds to a size of the sensor data that the EDT uses in a single transmission, and
   wherein the TBS is provided in System Information (SI) and/or in an Uplink (UL) grant.
4. The method of Embodiment 3, wherein the TBS comprises a remaining portion that includes non-sensor data that corresponds to the application.
5. The method of Embodiment 4, wherein the non-sensor data comprises protocol overhead data corresponding to the application.
6. The method of any of Embodiments 1-5, wherein determining whether the UE and/or the application that is running on the UE is using or planning to use the EDT to transmit sensor data via the network comprises monitoring, by the UE, the broadcast System Information (SI) for content that corresponds to the EDT.
7. The method of Embodiment 6, wherein the content that corresponds to the EDT comprises content that is associated with the Transport Block Size (TBS) and/or a configuration corresponding to Physical Random Access Channel (PRACH) resources for the EDT.
8. The method of any of Embodiments 1-7, wherein informing the application of configuration parameters corresponding to the EDT comprises sending, to the application, information that is provided in an Up Link (UL) grant in a Random Access Response (RAR) message.
9. The method of Embodiment 8, wherein information that is provided in an Up Link (UL) grant in a Random Access Response (RAR) message comprises a maximum quantity of data that the UE can include in the EDT in the single transmission.
10. The method of any of Embodiments 1-9, wherein informing the application of configuration parameters corresponding to the EDT comprises sending, to the application, information that corresponds to previous EDT transmissions and previous UL grants corresponding to previous EDT's.
11. The method of Embodiment 10, wherein altering, by the application, properties of the sensor data that is provided to the UE for transmission to the network to include revised sensor data comprises estimating a predicted Transport Block (TB) and adapting future EDT sizes for future EDT's.
12. The method of any of Embodiments 10-11, further comprising, sending, by the application, a query to lower layers and receiving TBS information via an Application Program Interface (API).
13. The method of any of Embodiments 1-12, wherein altering, by the application, properties of the sensor data that is provided to the UE for transmission to the network to include revised sensor data comprises omitting non-essential metadata from data objects corresponding to the revised sensor data.
14. The method of Embodiment 13, wherein non-essential metadata comprises Sensor Measurement List (SenML) records comprising a pointer for further information about measurements and/or configuration parameters.
15. The method of Embodiment 13, wherein non-essential metadata comprises Sensor Measurement List (SenML) records comprising less than a total number of records by using a lower sampling resolution.
16. The method of any of Embodiments 1-12, wherein altering, by the application, properties of the sensor data that is provided to the UE for transmission to the network to include revised sensor data comprises choosing between different encodings to adjust behavior for the TBS.
17. The method of any of Embodiments 1-12, wherein the application comprises a plurality of layers of versions of sensor data to be transmitted, wherein each of the plurality of layers comprises a different size of EDT message for transmission.
18. A first communication node, wherein the first communication node is adapted to perform according to any of Embodiments 1-17.
19. A first communication node comprising:
   a network interface configured to communicate with a second network node via an access network; and
   a processor coupled to the network interface and configured to perform operations comprising:
   determining whether the first communication node and/or an application that is running on the first communication node is using or planning to use an early data transmission (EDT) to transmit sensor data via the network;

responsive to determining that the first communication node and/or the application that is running on the first communication node is using or planning to use the EDT, informing the application of configuration parameters corresponding to the EDT; and altering, by the application and based on the configuration parameters corresponding to the EDT, properties of the sensor data that is provided to the first communication node for transmission to the network to include revised sensor data.

20. The first communication node of Embodiment 19, wherein the processor is adapted to perform operations according to any of Embodiments 2-17.

21. A first communication node, wherein the first communication node includes respective modules adapted to perform according to any of Embodiments 1-17.

22. A method of operating a first communication node, the method comprising:

sending, to a User Equipment (UE), data that includes information that the UE uses to determine whether the UE and/or an application that is running on the UE is using or planning to use an early data transmission (EDT) to transmit sensor data via the network; and responsive to the UE determining that the UE and/or the application that is running on the UE is using or planning to use the EDT, receiving data from the UE that includes a data content corresponding to configuration parameters of the EDT.

23. A first communication node comprising:

a network interface configured to communicate with a user Equipment (UE), via an access network; and a processor coupled to the network interface and configured to perform operations comprising:

sending, to the UE, data that includes information that the UE uses to determine whether the UE and/or an application that is running on the UE is using or planning to use an early data transmission (EDT) to transmit sensor data via the network; and responsive to the UE determining that the UE and/or the application that is running on the UE is using or planning to use the EDT, receiving data from the UE that includes a data content corresponding to configuration parameters of the EDT.

24. A first communication node, wherein the first communication node includes respective modules adapted to perform according to Embodiment 24.

25. A user equipment, UE, comprising:

a transceiver configured to communicate with a first network node via a radio access network; and a processor coupled to the transceiver and configured to perform operations comprising:

determining whether the UE and/or an application that is running on the UE is using or planning to use an early data transmission (EDT) to transmit sensor data via the network;

responsive to determining that the UE and/or the application that is running on the UE is using or planning to use the EDT, informing the application of configuration parameters corresponding to the EDT; and altering, by the application, properties of the sensor data that is provided to the UE for transmission to the network to include revised sensor data.

26. A user equipment, UE, including respective modules adapted to perform operations according to Embodiment 25.

27. A user equipment, UE, including respective modules adapted to perform operations according to Embodiments 2-17.

In the specification, there have been disclosed embodiments of the inventive concepts and, although specific terms are employed, they are used in a generic and descriptive sense only and not for purposes of limitation. The following claim is provided to ensure that the present application meets all statutory requirements as a priority application in all jurisdictions and shall not be construed as setting forth the scope of the present inventive concepts.

What is claimed is:

1. A method of operating a user equipment (UE) that is operating in a network, the method comprising:

determining whether the UE and/or an application that is running on the UE is using or planning to use an early data transmission (EDT) to transmit sensor data via the network;

responsive to determining that the UE and/or the application that is running on the UE is using or planning to use the EDT, informing the application of configuration parameters corresponding to the EDT; and altering, by the application and based on the configuration parameters corresponding to the EDT, properties of the sensor data that is provided to the UE for transmission to the network to include revised sensor data, wherein the revised sensor data is generated, derived, or selected to fit in the EDT in a single transmission.

2. The method of claim 1, wherein altering the properties of the sensor data comprises changing a size of the data to be sent as the revised sensor data.

3. The method of claim 1, wherein a Transport Block Size (TBS) corresponds to a size of the sensor data that the EDT uses in the single transmission, and wherein the TBS is provided in System Information (SI) and/or in an Uplink (UL) grant.

4. The method of claim 1, wherein a Transport Block Size (TBS) is calculated using System Information (SI).

5. The method of claim 3, wherein the TBS comprises a remaining portion that includes non-sensor data that corresponds to the application.

6. The method of claim 5, wherein the non-sensor data comprises protocol overhead data corresponding to the application.

7. The method of claim 1, wherein determining whether the UE and/or the application that is running on the UE is using or planning to use the EDT to transmit the sensor data via the network comprises monitoring, by the UE, broadcast System Information (SI) for content that corresponds to the EDT.

8. The method of claim 7, wherein the content that corresponds to the EDT comprises content that is associated with a Transport Block Size (TBS) and/or a configuration corresponding to Physical Random Access Channel (PRACH) resources for the EDT.

9. The method of claim 1, wherein informing the application of the configuration parameters corresponding to the EDT comprises sending, to the application, information that is provided in an Up Link (UL) grant in a Random Access Response (RAR) message.

10. The method of claim 1, wherein information that is provided in an Up Link (UL) grant in a Random Access Response (RAR) message comprises a maximum quantity of data that the UE can include in the EDT in the single transmission.

11. The method of claim 1, wherein informing the application of the configuration parameters corresponding to the EDT comprises sending, to the application, information that corresponds to previous EDT transmissions and previous UL grants corresponding to the previous EDT transmissions.

12. The method of claim 11, wherein altering, by the application, the properties of the sensor data that is provided to the UE for transmission to the network to include the revised sensor data comprises estimating a predicted Transport Block (TB) and adapting future EDT sizes for future EDT transmissions.

13. The method of claim 11, further comprising, sending, by the application, a query to lower layers and receiving Transport Block Size (TBS) information via an Application Program Interface (API).

14. The method of claim 1, wherein altering, by the application, the properties of the sensor data that is provided to the UE for transmission to the network to include the revised sensor data comprises omitting non-essential metadata from data objects corresponding to the revised sensor data.

15. The method of claim 14, wherein the non-essential metadata comprises Sensor Measurement List (SenML) records comprising a pointer for further information about measurements and/or configuration parameters.

16. The method of claim 14, wherein the non-essential metadata comprises Sensor Measurement List (SenML) records comprising less than a total number of records by using a lower sampling resolution.

17. The method of claim 1, wherein altering, by the application, the properties of the sensor data that is provided to the UE for transmission to the network to include the revised sensor data comprises choosing between different encodings to adjust behavior for a Transport Block Size (TBS).

18. The method of claim 1, wherein the application comprises a plurality of layers of versions of the sensor data to be transmitted, wherein each of the plurality of layers comprises a different size of EDT message for transmission.

19. A method of operating a first communication node, the method comprising:
   sending, to a User Equipment (UE) data that includes information that the UE uses to determine whether the UE and/or an application that is running on the UE is using or planning to use an early data transmission (EDT) to transmit sensor data via a network; and
   responsive to the UE determining that the UE and/or the application that is running on the UE is using or planning to use the EDT, receiving the data from the UE that includes a data content corresponding to configuration parameters of the EDT, wherein revised sensor data is generated, derived, or selected to fit in the EDT in a single transmission.

20. A user equipment (UE) comprising:
   a transceiver configured to communicate with a first network node via a radio access network; and
   a processor coupled to the transceiver and configured to perform operations comprising:
   determining whether the UE and/or an application that is running on the UE is using or planning to use an early data transmission (EDT) to transmit sensor data via a network;
   responsive to determining that the UE and/or the application that is running on the UE is using or planning to use the EDT, informing the application of configuration parameters corresponding to the EDT; and
   altering, by the application, properties of the sensor data that is provided to the UE for transmission to the network to include revised sensor data, wherein the revised sensor data is generated, derived, or selected to fit in the EDT in a single transmission.

\* \* \* \* \*